April 18, 1933.  F. E. WATTS  1,904,841
REAR END CONSTRUCTION FOR VEHICLE BODIES
Filed Dec. 22, 1930
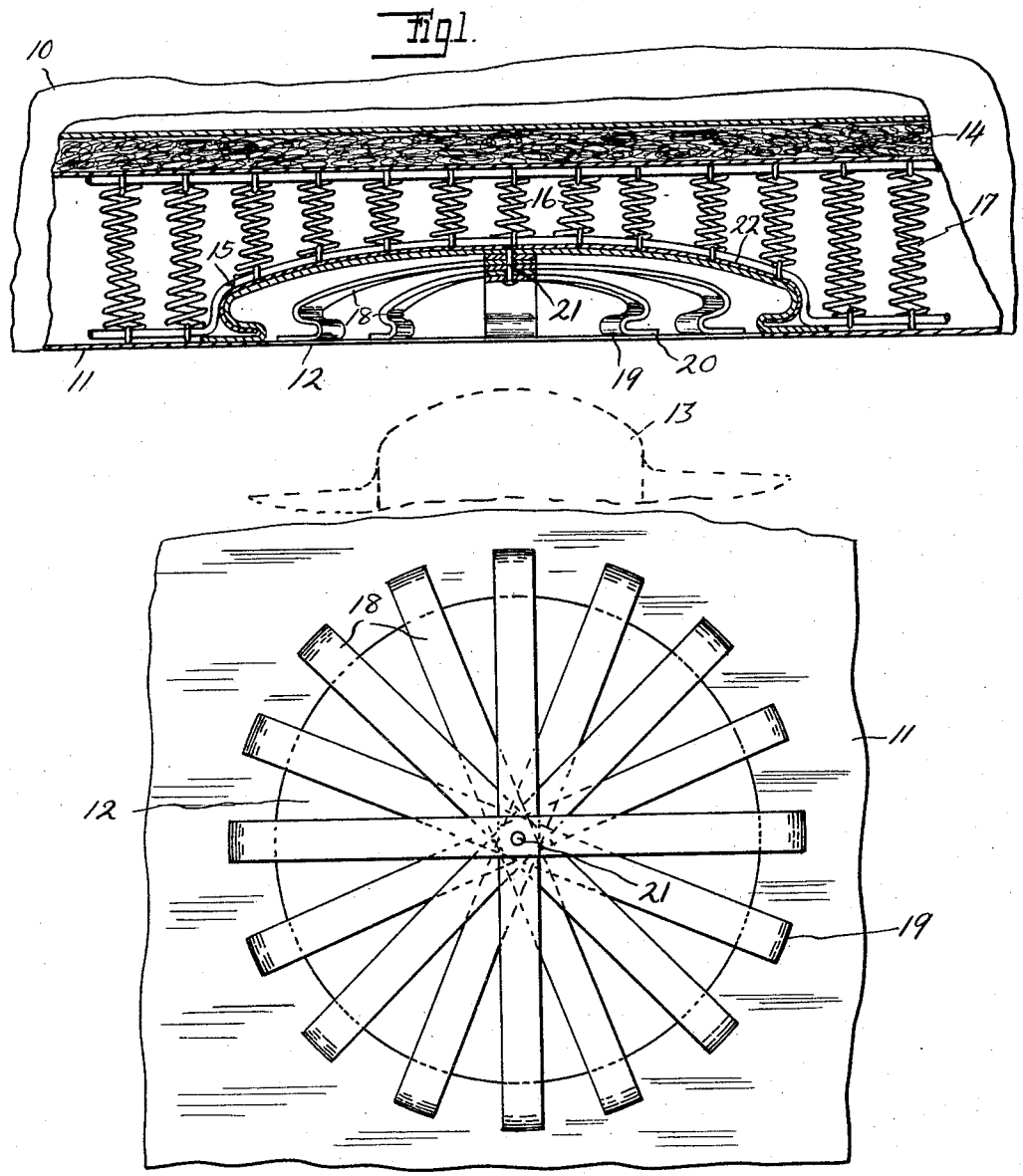
INVENTOR
Frank E. Watts
BY Whittemore Hulbert
Whittemore & Belknap
ATTORNEYS Patented Apr. 18, 1933

1,904,841

UNITED STATES PATENT OFFICE

FRANK E. WATTS, OF DETROIT, MICHIGAN, ASSIGNOR TO HUPP MOTOR CAR CORPORATION, OF DETROIT, MICHIGAN, A CORPORATION OF VIRGINIA

REAR END CONSTRUCTION FOR VEHICLE BODIES

Application filed December 22, 1930. Serial No. 504,141.

This invention relates generally to vehicle bodies and more particularly to the rear end construction of vehicle bodies.

It is customary, in vehicle bodies as now commercially produced, to cut away a portion of the flooring above the rear axle differential housing to permit unrestricted vertical travel of the latter. In order to provide an efficient construction, the opening aforesaid is usually closed by a suitable metallic pan extending upwardly into the body a sufficient distance to provide the necessary clearance for upward travel of the differential upon movement of the latter relative to the body.

While the foregoing construction is satisfactory in the single-seated type of body, nevertheless, it is objectionable in the two-seated design, since the pan aforesaid usually assumes a position directly beneath the rear seat cushion, necessitating either elevating the latter to clear the pan or shortening the central coils of the same to permit the pan to project into the cushion proper. Elevating the rear cushion to clear the top of the pan would necessitate increasing the height of the body to provide sufficient head clearance; and since the industry is constantly striving to reduce the overall height of vehicle bodies to the minimum, such an arrangement would obviously be objectionable. On the other hand, reducing the length of the central coils of the cushion to provide a recess of sufficient size to receive the pan is also objectionable, since it materially interferes with the flexibility of the cushion. It is therefore one of the principal objects of this invention to eliminate the objections specified above, without appreciably affecting the cost of manufacture and at the same time permitting the height of the body to be reduced without affecting head clearance.

The foregoing as well as other objects will be made more apparent as this description proceeds, especially when considered in connection with the accompanying drawing, wherein:

Figure 1 is a diagrammatic sectional view taken through the rear portion of a vehicle body constructed in accordance with this invention; and Figure 2 is a plan view illustrating the housing for the opening in the rear floor portion of the body.

While the present invention contemplates a construction wherein the rear cushion is provided with a recess in the bottom face thereof of sufficient size to receive the pan for the rear axle differential housing, nevertheless, the objection to this construction, as previously pointed out, is eliminated by fashioning the pan of flexible material. The arrangement is such that the pan forms a flexible support for the relatively short coil springs of the cushion with the result that the central portions of the latter will have practically the same flexibility as the remaining portions of the same equipped with the comparatively longer coil springs. Moreover, with the present construction, as outlined above, shorter coil springs may be employed within the cushion above the pan permitting a reduction in the height of the cushion and as a consequence, rendering it possible to correspondingly reduce the height of the body without sacrificing headroom.

In detail, there is illustrated in Figure 1 the rear portion of a vehicle body 10 having flooring 11 provided with an opening 12 therein through which the rear axle differential housing 13 is adapted to project upon relative vertical movements of the latter and body. Secured to the portions of the flooring bordering the opening 12 and extending into a recess formed in the rear cushion 14 is a pan 15 serving to support the central coils 16 of the cushion a sufficient distance above the opening 12 to provide the necessary clearance for upward travel of the differential housing. The recess in the cushion for receiving the pan is formed by fashioning the central group of coil springs 16 shorter than the outer coils 17 and since it is the practice to provide a seat of minimum height, it is often the case that the central coil springs are too short to provide sufficient flexibility with the result that any appreciable weight on the central portion of the seat compresses the coils 16 against the top of the pan 15 materially affecting the riding qualities of the vehicle. The foregoing is eliminated in the present instance by fashioning the pan of flexible material and since the latter supports the spring coils 16, the same materially increases the flexibility of the central portions of the seat.

In detail, the pan 15 is formed of a plurality of spring metal members 18 extending diametrically across the opening, as shown in Figure 2, and bowed upwardly intermediate the ends for engaging and supporting the central coils 16. In order to increase the flexible qualities of the members 18, the free ends thereof are substantially S-shaped or in other words are reversely curved as at 19 terminating in outwardly extending flanges 20 engaging the flooring 11 and suitably secured thereto. If desired, the central overlapping portions of the spring members 18 may be secured together by a suitable fastening element 21 and a flexible weatherproof covering 22 may be fastened to the under sides of the members 18 to prevent water and foreign matter from finding its way into the body.

Thus, from the foregoing it will be apparent that I have provided an improved pan construction for the rear ends of vehicle bodies arranged to support the rear seat cushion and formed of a flexible material so as to yield to shock and thereby permit utilizing a lower pan than has heretofore been considered possible. Moreover, by virtue of my improved arrangement as previously described, the required length of the coil springs in the seat cushion supported by the flexible pan is less than would ordinarily be required if a rigid housing were used since the pan in the present instance forms a flexible support for the coil springs with the result that when the portions of the cushion above the pan is occupied, the pan will flex and the weight of the passenger will be partially supported by the remaining coil springs in the cushion.

While in describing the present invention particular stress has been placed upon the provision of a flexible rear body pan formed of a plurality of radially extending spring bars terminating in S-shaped end portions to increase the flexibility thereof, nevertheless, it is to be noted that the above specific construction is for the purpose of illustration only and that the pan may be fashioned in numerous other ways. For example, the flexible pan may be formed of spring bars arranged in several different ways or may be formed from moulded rubber or rubber compositions, and accordingly reservation is made to make such changes as may come within the purview of the accompanying claims.

What I claim as my invention is:

1. A rear end construction for vehicle bodies comprising a floor section having an opening therethrough for axle housing clearance, and a closure member for said opening having flexible portions spaced above the opening providing for maximum deflection of the axle housing with the minimum height of closure.

2. A rear end construction for vehicle bodies comprising a floor section having an opening therethrough for axle housing clearance, and a closure for the opening having a plurality of spring metal strips extending across the opening above the same.

3. A rear end construction for vehicle bodies comprising a floor section having an opening therethrough for axle housing clearance, and a circular pan having a plurality of radially extending spring metal members positioned above said opening terminating in downwardly curved end portions secured to the floor section.

4. A body pan for rear axle housing clearance having a plurality of radially extending spring metal members secured together intermediate the ends and provided with downwardly curved end portions for engaging a support.

5. A rear end construction for vehicle bodies comprising a floor section having an opening therethrough for axle housing clearance, a member positioned above said opening formed of a plurality of spring metal strips, and a sheet of flexible material secured to said strips for closing the opening.

6. A rear end construction for vehicle bodies comprising a floor section having an opening therethrough for axle housing clearance, a closure for the opening spaced above the latter and comprising a plurality of spring metal strips extending across the opening and provided with downwardly curved end portions secured to the portions of the floor section surrounding the opening, and a sheet of flexible material secured to said strips for closing the opening.

7. A rear end construction for vehicle bodies comprising a floor section having an opening therethrough for axle housing clearance, a flexible seat arranged above the opening and formed of a plurality of coil springs with the coils above the opening substantially shorter than the remaining coils forming a recess, and a flexible closure for said opening projecting into said recess and forming a support for the relatively short coils of said seat.

8. A rear end construction for vehicle bodies comprising a floor section having an opening therethrough for axle housing clearance, a flexible seat arranged above the opening and formed of a plurality of coil springs with the coils above the opening substantially shorter than the remaining coils forming a recess, a closure for the opening extending into the recess aforesaid and comprising a plurality of flexible strips forming a support for the relatively short coils of the seat and provided with downwardly extending curved portions engaging the portions of the floor section surrounding the opening.

9. A rear end construction for vehicle bodies comprising a floor section formed with an opening therethrough for axle housing clearance and adapted to support a seat cushion having a depressed portion located above the opening, and a flexible closure for the opening fashioned to fit within the depressed portion of the cushion.

10. A rear end construction for vehicle bodies comprising a floor section formed with an opening therethrough for axle housing clearance and adapted to support a seat cushion having coil springs above the opening substantially shorter than the remaining springs forming a recess in the cushion, and a flexible closure for the opening extending into the depressed portion of the cushion and engageable with the relatively shorter coil springs for increasing the flexibility of the depressed portion of the cushion.

11. A rear end construction for vehicle bodies comprising a floor section formed with an opening therethrough for axle housing clearance and adapted to support a seat cushion having a depressed portion located above the opening, and a closure for the opening having flexible portions located within the body above the opening and fashioned to fit within the depressed portion of the cushion to increase the flexibility of the portions of the cushion above the same.

In testimony whereof I affix my signature.

FRANK E. WATTS.